(12) United States Patent
Parker

(10) Patent No.: US 7,337,519 B2
(45) Date of Patent: Mar. 4, 2008

(54) METHOD FOR PRODUCING A COILED TUBING CONNECTOR ASSEMBLY

(75) Inventor: Robert Parker, Dorset (GB)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 11/400,285

(22) Filed: Apr. 10, 2006

(65) Prior Publication Data

US 2006/0278401 A1    Dec. 14, 2006

Related U.S. Application Data

(63) Continuation-in-part of application No. 11/149,174, filed on Jun. 10, 2005.

(51) Int. Cl.
*B23P 11/00* (2006.01)

(52) U.S. Cl. .............. 29/505; 29/508; 29/516; 29/517; 285/382.1; 285/382.2; 166/77.2; 166/242.6

(58) Field of Classification Search ............. 29/505, 29/506, 508, 509, 516, 517, 518; 285/256, 285/259, 382.1, 382.2, 333, 334.1; 166/77.2, 166/242.6

See application file for complete search history.

(56) References Cited

U.S. PATENT DOCUMENTS

| | | | | |
|---|---|---|---|---|
| 1,825,005 | A | * | 9/1931 | Loughead .................... 285/256 |
| 2,641,488 | A | * | 6/1953 | Dunn et al. ................. 285/333 |
| 3,895,177 | A | * | 7/1975 | Muslin ........................ 174/669 |
| 4,063,760 | A | | 12/1977 | Moreiras et al. |
| 7,014,215 | B2 | * | 3/2006 | Cooper et al. .............. 285/247 |

FOREIGN PATENT DOCUMENTS

| WO | WO 93/24780 | 12/1993 |
|---|---|---|
| WO | WO 2005/056973 | 6/2005 |

* cited by examiner

*Primary Examiner*—Jermie E. Cozart
(74) *Attorney, Agent, or Firm*—Finnegan, Henderson, Farabow, Garrett & Dunner LLP

(57) ABSTRACT

A coiled tubing connector for connecting tools together when they are inserted into a well bore. The connector includes a disposable element that may be severed along with the connected portion of the coiled tubing. This provides for quick disconnect and reuse of the remainder of the connector.

1 Claim, 2 Drawing Sheets

An Ultra Slim, Semi Disposable, Torque through, Coiled tubing Connector.

METHOD FOR PRODUCING A COILED TUBING CONNECTOR ASSEMBLY

This application is a CIP of U.S. application Ser. No. 11/149,174 filed Jun. 10, 2005 which is still pending.

BACKGROUND OF THE INVENTION

The present invention relates to a coiled tubing connector for connecting to tools when they are inserted into a well bore.

In oil drilling and other well operations, a coiled tubing is used for raising and lowering tools into the well bore. Specifically, this is achieved by attaching a tool to the end of a reel of coiled tubing. By reeling out the coiled tubing, the tool may be lowered to the desired location within the well. Various tools for gathering data and the like may be attached for placement within the well bore.

In applications of this type, the connector at each end of the coiled tubing inserted within the well bore is subject to tension, compression and torque forces within the well. Consequently, it must be of a construction that will not disconnect under these conditions. In addition, however, it is necessary to have a connector that may be readily disconnected upon removal from the well bore for reuse.

The present invention provides a coiled tubing connector that achieves both of these objects in providing resistance from separating forces in combination with ease of connection, sealing and disconnection upon removal of the connector from the well bore by merely a single, severing operation wherein a disposable portion of the connector is severed along with the portion of the coiled tubing connected thereto to permit the remainder of the connector to remain undamaged and thus reusable.

SUMMARY OF THE INVENTION

The invention relates to a coiled tubing connector assembly for connecting a coiled tubing to a coiled tubing tool for insertion and use in a well bore, such as a gas or oil well. The assembly comprises a connector housing having at one end thereof means for connection to a coiled tubing tool and having at an opposite end thereof means for connection to a coiled tubing. The means for connection to the coiled tubing includes a sleeve removably secured to the housing at the opposite end thereof and having an extended portion coaxially extending a distance therefrom to form a tubular passage. The coiled tubing has an extended end portion thereof which extends into the tubular passage and a connecting opening in the connector housing. The extended end portion of the sleeve and the extended end portion of the coiled tubing each have a mating deformation therein securing the coiled-tubing to the coiled tubing connector within the tubular passage. This structure may be produced by roll forming mating circumferential grooves in the extended end portion of sleeve and coiled tubing.

The coiled tubing connector assembly may further include means for sealing the connector and the coiled tubing when inserted within the well bore. This may include roll forming of a circumferential groove in the extended portion of the coiled tubing for mounting an O-ring seal therein.

The coiled tubing connector assembly may further include the connector housing and the extended end portion of the coiled tubing each having abutting portions in engagement with the housing, which portions are structured to prevent rotation of the assembly.

The coiled tubing connector assembly may include the abutting portions having matching angular abutting surfaces to prevent axial rotation of the assembly.

DESCRIPTION OF THE EMBODIMENTS

Figure 1:
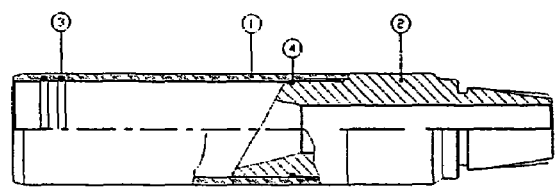
FIG. 1 is a view in partial vertical cross section of an embodiment of the coiled-tubing connector in accordance with the invention.

With reference to the drawings, and presently FIG. 1 thereof, there is shown a coiled tubing connector having a disposable outer sleeve 1 threadably connected to housing 2. O-rings 3 and 4 provide for sealing of the assembly against pressure when inserted within a well bore.

Figure 2:
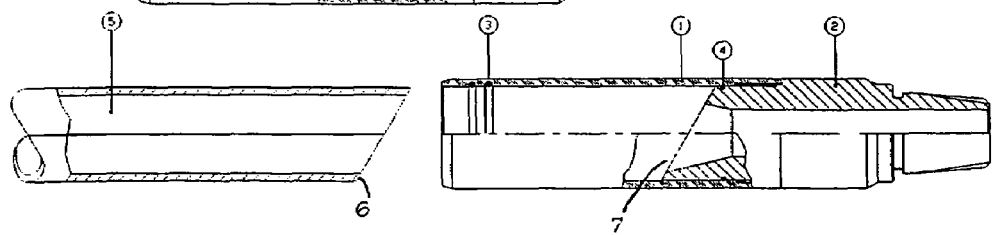
FIG. 2 is a similar view showing the coiled-tubing connector and a portion of the coiled-tubing for insertion into and in connection with the coiled-tubing connector.

With reference to FIG. 2, there is shown an end portion of a coiled tubing 5 for insertion within the housing 2 and disposable sleeve 1.

Figure 3:
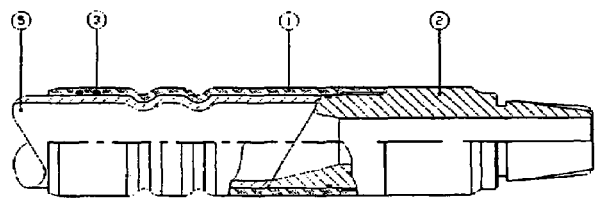
FIG. 3 is a similar view showing the coiled-tubing connector and coiled-tubing in assembly.

In FIG. 3, the end of the coiled tubing 5 is shown in assembly with the connector and having an angled end portion 6 abutting matching surface 7 of the connector. This structure prevents relative axial rotation of the connector and the coiled tubing within the well bore.

Figure 4:
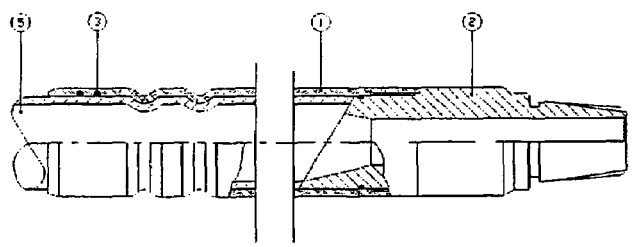
FIG. 4 is a similar view showing the assembly of FIG. 3 severed to separate the disposable portion of the assembly from the coiled-tubing connector.

FIG. 4 is a view of the assembly similar to FIG. 3 in showing the severance of the coiled tubing from the connector at the disposable sleeve 1. When this is accomplished, the remainder of the sleeve may be threadably disengaged from the housing 2. The housing may then be readied for reuse by threadably connecting another disposable sleeve thereto.

Figure 5:
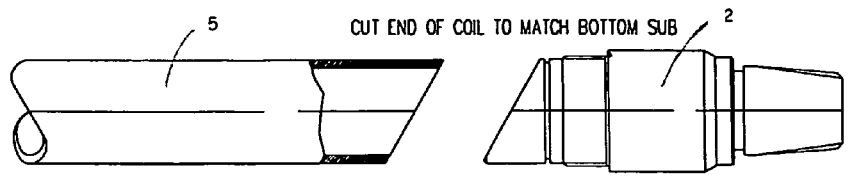
FIG. 5 is a view in partial cross-section of the coiled-tubing connector and coiled tubing.
Figure 6:
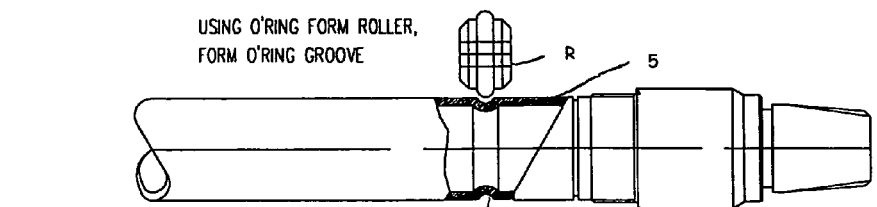
FIG. 6 is a view in partial cross-section with the connector and coiled tubing in engagement and an O-ring form roller forming a circumferential groove in the coiled tubing surface.
Figure 7:
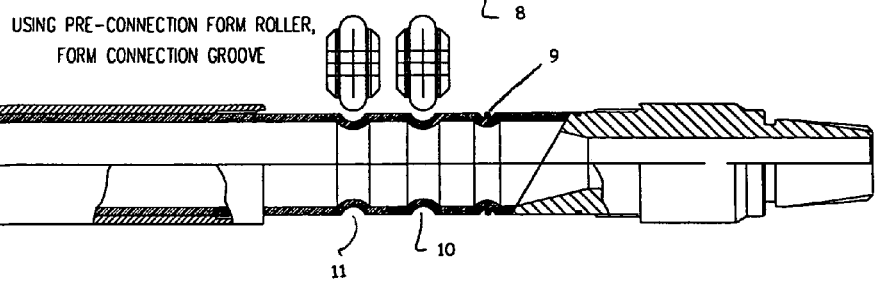
FIG. 7 is a view in partial cross-section showing an O-ring seal mounted within the groove formed as shown in FIG. 6 and with two additional O-ring form rollers producing two additional circumferential grooves in the outer surface of the coiled tubing.
Figure 8:
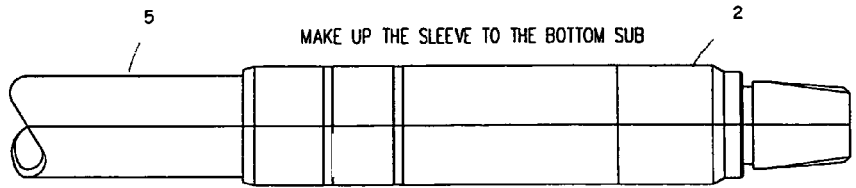
FIG. 8 is a view of the connector and coiled tubing in engagement.
Figure 9:
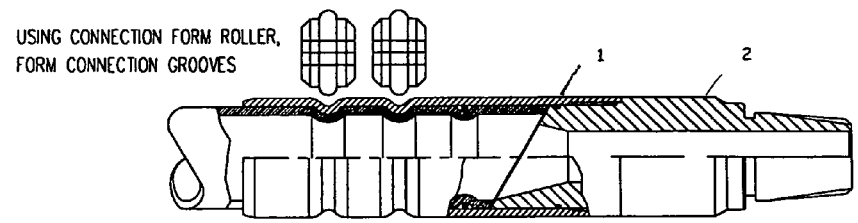
FIG. 9 is a partial cross-section of the connector, coiled tubing and sleeve in assembly with two O-ring form rollers producing mating circumferential grooves in the sleeve mating with the grooves in the coiled tubing for connection thereof.
Figure 10:
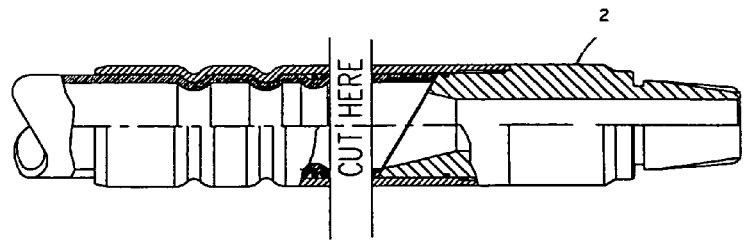
FIG. 10 is a view similar to FIG. 9 showing separation of the coiled tubing and coiled tubing connector by cutting the sleeve and coiled tubing.

With the components of FIG. 5 in engagement, as shown in FIG. 6, an O-ring form roller R forms a circumferential groove 8 on the exterior surface of the coiled tubing 5. As shown in FIG. 6, and O-ring seal 9 is mounted within this groove 8. Two additional O-ring form rollers R are used to produce two additional circumferential grooves 10 and 11 in the surface of the coiled tubing. With the coiled tubing and connector in the "makeup" assembly of FIG. 8, the disposable sleeve 1 extends over the grooves 10 and 11 of the coiled tubing and rollers R are used to form mating, connective grooves to connect the coiled tubing and connector 2. Thereafter, removal of the coiled tubing from the connector 2 for reuse of the connector is achieved by cutting action, as shown in FIG. 10.

What is claimed is:

1. A method for producing a coiled-tubing connector assembly for connecting a coiled tubing to a coiled tubing tool for insertion and use in a well bore of a gas or oil well, comprising:

providing a connector housing having at one end thereof means for connection to a coiled tubing tool and having at an opposite end thereof means for connection to a coiled tubing;

said means for connection to said coiled tubing including a sleeve removably secured to said housing at said opposite end thereof and having an extended portion coaxially extending a distance therefrom to form a tubular passage;

roll forming at least one circumferential groove in said extended portion of said sleeve;

providing a coiled tubing having an extended end portion thereof extending into said tubular passage and a connecting opening in said connector housing;

roll forming a circumferential groove in said extended end portion of said coiled tubing in mating engagement with each circumferential groove in said extended portion of said sleeve to secure said coiled tubing to said coiled tubing connector assembly within said tubular passage; and roll forming an additional circumferential groove in said extended end portion of said coiled tubing and mounting an O-ring seal therein.

* * * * *